United States Patent
O'Connor et al.

(10) Patent No.: US 9,665,126 B2
(45) Date of Patent: *May 30, 2017

(54) DUAL SCREEN FOLDING DISPLAY HINGE

(71) Applicant: Flextronics AP, LLC, Broomfield, CO (US)

(72) Inventors: Mike O'Connor, Gurnee, IL (US); Marty Kimbell, Wauconda, IL (US); Steve Gaynes, McHenry, IL (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,671

(22) Filed: Sep. 4, 2014

(65) Prior Publication Data

US 2014/0373338 A1    Dec. 25, 2014

Related U.S. Application Data

(62) Division of application No. 13/298,229, filed on Nov. 16, 2011, now Pat. No. 8,854,834.

(60) Provisional application No. 61/414,107, filed on Nov. 16, 2010.

(51) Int. Cl.
| | |
|---|---|
| H05K 7/02 | (2006.01) |
| E05D 11/06 | (2006.01) |
| H05K 13/00 | (2006.01) |
| G06F 1/16 | (2006.01) |
| H04M 1/02 | (2006.01) |
| E05D 3/12 | (2006.01) |
| E05D 11/10 | (2006.01) |

(52) U.S. Cl.
CPC .......... *G06F 1/1641* (2013.01); *G06F 1/1681* (2013.01); *H04M 1/022* (2013.01); *E05D 3/12* (2013.01); *E05D 11/105* (2013.01); *E05Y 2900/606* (2013.01); *H04M 2250/16* (2013.01); *Y10T 16/547* (2015.01); *Y10T 16/54028* (2015.01); *Y10T 16/54029* (2015.01); *Y10T 16/54038* (2015.01); *Y10T 16/551* (2015.01); *Y10T 29/49002* (2015.01)

(58) Field of Classification Search
CPC .............................. G06F 1/1615; G06F 1/1616
USPC .............. 361/807, 679.27; 16/311, 325, 374; 29/592.1
See application file for complete search history.

(56) References Cited

U.S. PATENT DOCUMENTS

| | | |
|---|---|---|
| 4,359,487 A | 11/1982 | Schneider |
| 5,590,021 A | 12/1996 | Register |
| 5,903,894 A | 5/1999 | Reneris |
| 6,222,507 B1 | 4/2001 | Gouko |
| 6,302,612 B1 | 10/2001 | Fowler et al. |
| 6,532,146 B1 | 3/2003 | Duquette |
| 6,667,877 B2 | 12/2003 | Duquette |
| 6,667,878 B2 | 12/2003 | Ponx |
| 6,690,585 B2 | 2/2004 | Betts-LaCroix |

(Continued)

*Primary Examiner* — Tuan T Dinh
*Assistant Examiner* — Mukund G Patel
(74) *Attorney, Agent, or Firm* — Haverstock & Owens LLP (57) ABSTRACT

Dual screen display devices are disclosed. The device is able to be a mechanical hinge capable of joining multiple screens to form a single display or a substantially continuous display. The device is also capable of splitting a jointed display into separated screens. In some embodiments, the device comprises detaining mechanisms allowing the device to instantly interchange among several pre-defined angles or positions.

11 Claims, 8 Drawing Sheets

(56) References Cited

U.S. PATENT DOCUMENTS

| | | |
|---|---|---|
| 6,928,464 B2 | 8/2005 | Appiah et al. |
| 6,991,350 B2 | 1/2006 | McInnis |
| 7,054,963 B2 | 5/2006 | Betts-LaCroix |
| D524,809 S | 7/2006 | Alcouloumre et al. |
| 7,247,032 B2 | 7/2007 | Merz |
| 7,249,873 B2 | 7/2007 | Tiesler et al. |
| 7,274,355 B2 | 9/2007 | Betts-LaCroix |
| 7,285,021 B2 | 10/2007 | Bell et al. |
| 7,352,332 B1 | 4/2008 | Betts-LaCroix |
| 7,353,053 B2 | 4/2008 | Prichard et al. |
| 7,357,648 B2 | 4/2008 | Merz |
| 7,372,454 B2 | 5/2008 | Betts-LaCroix |
| 7,390,197 B2 | 6/2008 | Merz |
| D579,451 S | 10/2008 | Ward et al. |
| D581,935 S | 12/2008 | Merz |
| 7,462,073 B2 | 12/2008 | Bell et al. |
| 7,493,500 B2 | 2/2009 | Chin et al. |
| 7,537,485 B2 | 5/2009 | Bell et al. |
| 7,572,021 B2 | 8/2009 | Sawada et al. |
| D602,938 S | 10/2009 | Ward et al. |
| 7,765,326 B2 | 7/2010 | Robbin et al. |
| 7,794,113 B2 | 9/2010 | Lee |
| 7,810,222 B2 | 10/2010 | Ward et al. |
| D628,199 S | 11/2010 | Yukikado et al. |
| D630,628 S | 1/2011 | Kovac |
| 7,991,442 B2 | 8/2011 | Kim |
| 8,021,022 B2 | 9/2011 | Ling et al. |
| D652,832 S | 1/2012 | Wu et al. |
| 8,111,040 B2 | 2/2012 | Guthrie |
| 8,223,487 B2 | 7/2012 | Chen et al. |
| 8,353,048 B1 | 1/2013 | Werner et al. |
| 8,567,999 B2 | 10/2013 | Paik et al. |
| 8,612,518 B2 | 12/2013 | Wu |
| 8,854,834 B2 | 10/2014 | O'Connor et al. |
| 2001/0043188 A1 | 11/2001 | Nakamura |
| 2003/0202339 A1 | 10/2003 | Oross et al. |
| 2005/0289266 A1 | 12/2005 | Illowsky et al. |
| 2006/0188096 A1 | 8/2006 | Aguilar |
| 2006/0224620 A1 | 10/2006 | Silverman et al. |
| 2007/0024588 A1 | 2/2007 | Yin et al. |
| 2007/0124372 A1 | 5/2007 | Liu et al. |
| 2008/0112113 A1* | 5/2008 | Sawadski et al. ............ 361/680 |
| 2008/0180391 A1 | 7/2008 | Auciello et al. |
| 2008/0266865 A1 | 10/2008 | Lev et al. |
| 2009/0109649 A1 | 4/2009 | Harris et al. |
| 2009/0122474 A1 | 5/2009 | Mickey et al. |
| 2009/0166493 A1 | 7/2009 | Lee |
| 2009/0220216 A1 | 9/2009 | Marsh et al. |
| 2009/0268401 A1 | 10/2009 | Krah |
| 2010/0042671 A1 | 2/2010 | Natt et al. |
| 2010/0064536 A1* | 3/2010 | Caskey et al. ................. 33/303 |
| 2010/0124006 A1 | 5/2010 | Chang |

* cited by examiner

DUAL SCREEN FOLDING DISPLAY HINGE

CROSS-REFERENCE TO RELATED APPLICATIONS

This application is a is a divisional application of co-pending U.S. patent application Ser. No. 13/298,229, filed on Nov. 16, 2011, and entitled "DUAL SCREEN FOLDING DISPLAY HINGE," which claims priority from U.S. Provisional Patent Application Ser. No. 61/414,107, filed Nov. 16, 2010 and entitled "DUAL SCREEN FOLDING DISPLAY HINGE," both of which are hereby incorporated herein by reference in their entirety for all purposes.

FIELD OF THE INVENTION

The present invention relates to the field of electronic device component assemblies. More specifically, the present invention relates to mechanical hinges.

BACKGROUND OF THE INVENTION

Some electronic devices are designed to be expandable to increase their portability. Such electronic devices can contain multiple screens capable of being used to expand viewable areas. Nonetheless, these typical devices often contain a protruding hinge between the screens. The hinge causes viewing gaps between the screens, which results in discontinuities between the screens. Further, the screens of the typical devices are often designed to be folded inward in a standby or resting mode, which does not allow the screens to be viewed when the devices are set to those modes.

Figure 1:
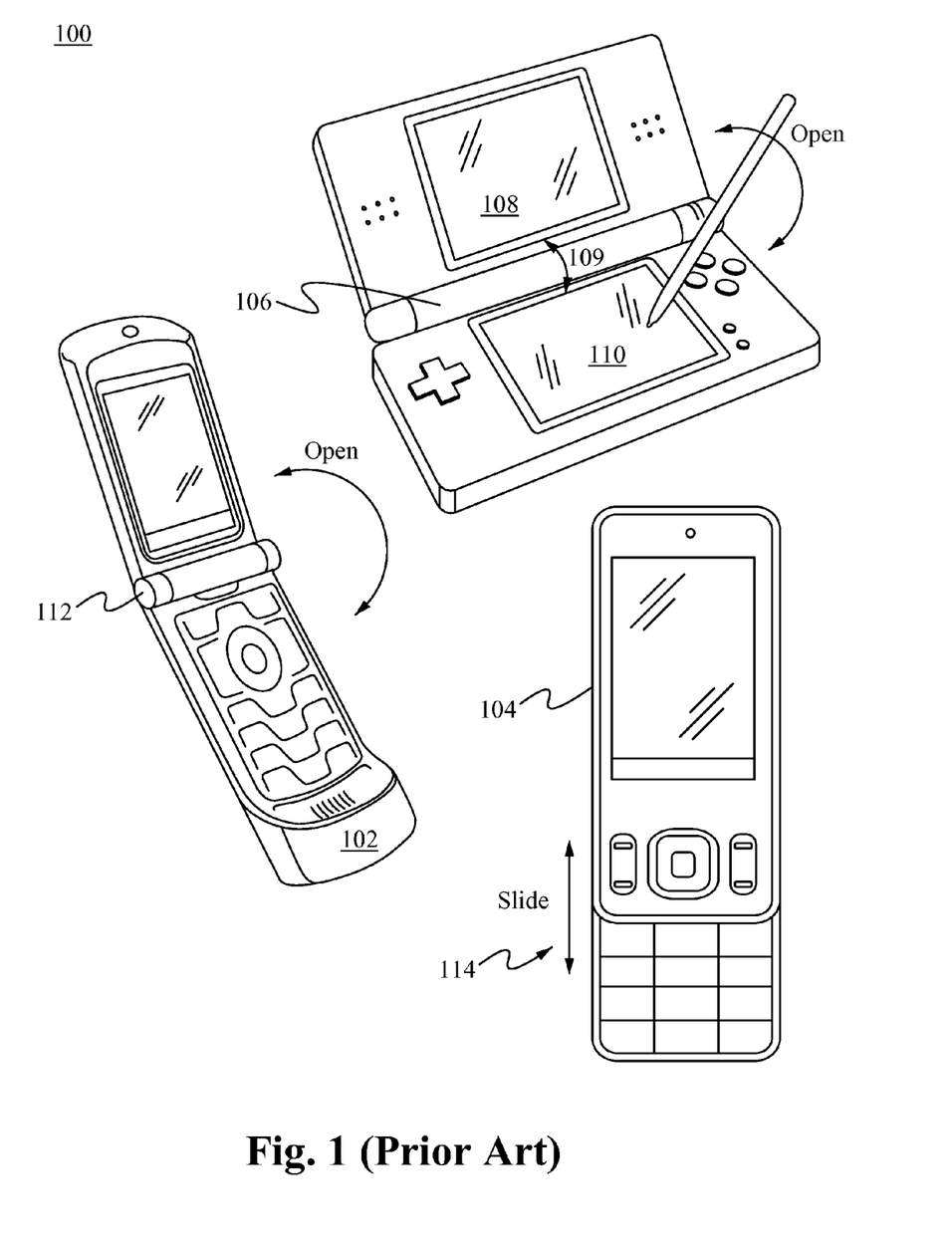
FIG. 1 illustrates typical electronic devices having single protruding hinges.

As shown in FIG. 1, a typical game console 100, such as Nintendo® DS, has an obvious protruding hinge 106 and separate screens 108 and 110. The hinge 106 forms a view barrier 109 separating the screens 108 and 110. The view barrier 109 requires the users to move their eyes back and forth between the two separated screens 108 and 110 and cannot enjoy a non-interrupted viewing experience. Similarly, many typical phones, such as phone 102, have hinges 112 located outside of the device making the device look like a "clamshell." The hinge 112 is viewable from the front of the device, which reduces the sleekness of the product. Some other devices, such as phone 104, have sliders and rails 114 allowing the device to extend. Although all these typical devices are designed to be expandable, none of these typical designs are capable of providing a continuous viewing experience of an expanded secreen.

SUMMARY OF THE INVENTION

Devices for and methods of making dual screen folding displays are disclosed. The dual screen display device can include a dual screen display hinge. The device is capable of joining multiple screens to form a single display or a substantially continuous display with a hidden hinge, so that the users are able to enjoy a non-gapping viewing experience of one single display or a continuous dual screen display. In some embodiments, the device comprises detents or detaining mechanisms allowing resting posture of the partly opened dual display with a stable angle.

In a first aspect, a device for forming a joined display comprises a core member, a first movable member capable of moving around the core member in a rotational manner, a second movable member capable of moving around the core member in a rotational manner, and a single display formed when a first surface is positioned substantially co-planar a second surface. The first movable member comprises the first surface. The second movable member comprises a second surface. In some embodiments, the first surface, the second surface, or both comprise one or more screens of an electronic device. In other embodiments, the one or more screens comprise an LCD, LED, plasma screen, or a combination thereof. In some other embodiments, the single display comprises a substantially continuous display having joined screens. In some embodiments, the core member comprises a first and second pivot hinges. In other embodiments, the first movable member is capable of moving in a rotational manner along the first pivot hinge. In some other embodiments, the device further comprises a detaining mechanism, such that a movement of the first movable member, the second movable member, or both is able to be stopped at a pre-defined angle. In some embodiments, the pre-defined angle comprises a position having the single display formed when a first display on the first movable member couples with a second display on the second movable member. In other embodiments, the pre-defined angle further comprises a position having a first display on the first movable member parallel to a second display on the second movable member. In some other embodiments, the pre-defined angle further comprises a position having a first display on the first movable member non-parallel to a second display on the second movable member. In some embodiments, the device further comprises an elastic member positioned in a direction non-parallel to the first and the second pivot hinges. In other embodiments, the elastic member comprises a spring.

In a second aspect, a method of forming a joined screen display comprises forming a body comprising at least a portion of a first rotatable member, at least a portion of a second rotatable member, or both, forming a first screen on the first rotatable member, and forming a second screen on the second rotatable member. The first screen and the second screen form a substantially continuous display when at least a portion of the first screen becomes substantially parallel to at least a portion of the second screen. In some embodiments, the first rotatable member is capable of rotating around a first axis and the second rotatable member is capable of rotating around a second axis. In some embodiments, the first axis and the second axis are contained within the body. In other embodiments, the first axis is substantially parallel to the second axis. In some other embodiments, the first screen and the second screen face outward in opposite directions when the first screen is substantially parallel to the second screen. In some embodiments, the method further comprises a detaining mechanism capable of detaining the first screen, the second screen, or both in a pre-determined angel. In other embodiments, the first screen, the second screen, or both are capable of instantly interchanging between a first position and a second position by changing a force of engagement of the detaining mechanism. In some other embodiments, the first screen is parallel to the second screen in the first and the second positions, wherein the first position of the first screen is perpendicular to the second position of the first screen. In some embodiments, the method further comprises an electronic device comprises the first screen, the second screen, the body, or a combination thereof. In other embodiments, the electronic device is in a power-on status when the substantially continuous display is formed. In some other embodiments, the electronic device is in a power-off status when the first screen disjoins from the second screen. In some embodiments, the electronic device comprises a phone, a computer, a music player, or a combination thereof.

In a third aspect, a mechanical device comprises a body, a first bracket rotatably coupling with the body with a first pivot, a second bracket rotatably coupling with the body with a second pivot, and at least one detaining member capable of detaining the first bracket, the second bracket, or both at one or more of pre-defined detaining locations on the first bracket, the second bracket, or both. In some embodiments, the pre-defined detaining locations comprise a first terminal location perpendicular to a second terminal location on a first rotating axis of the first bracket or a second rotating axis of the second bracket. In other embodiments, the pre-defined detaining locations comprise an intermediate location between the first and the second terminal locations. In some other embodiments, the first bracket couples with a first screen and the second bracket couples with a second screen. In some embodiments, the first screen and the second screen form a single display.

DETAILED DESCRIPTION OF THE INVENTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiments shown but is to be accorded the widest scope consistent with the principles and features described herein.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Additionally, it is contemplated that certain method steps of the invention can be performed in alternative sequences to those disclosed in the flowcharts. Accordingly, the scope of the claims should not be limited to any specific order of method steps unless the order is required by the language of the claims.

Dual screen display devices are disclosed. The device is able to be a mechanical hinge capable of joining multiple screens to form a single display or a substantially continuous display. The device is also capable of splitting a jointed display into separated screens. In some embodiments, the device comprises detents or detaining mechanisms allowing the device to instantly interchangeable among several pre-defined angles or pose at one or more pre-defined angles, such as a resting posture of partly opened dual display. In the following, some embodiments in accordance with the present invention are discussed.

Figure 2:
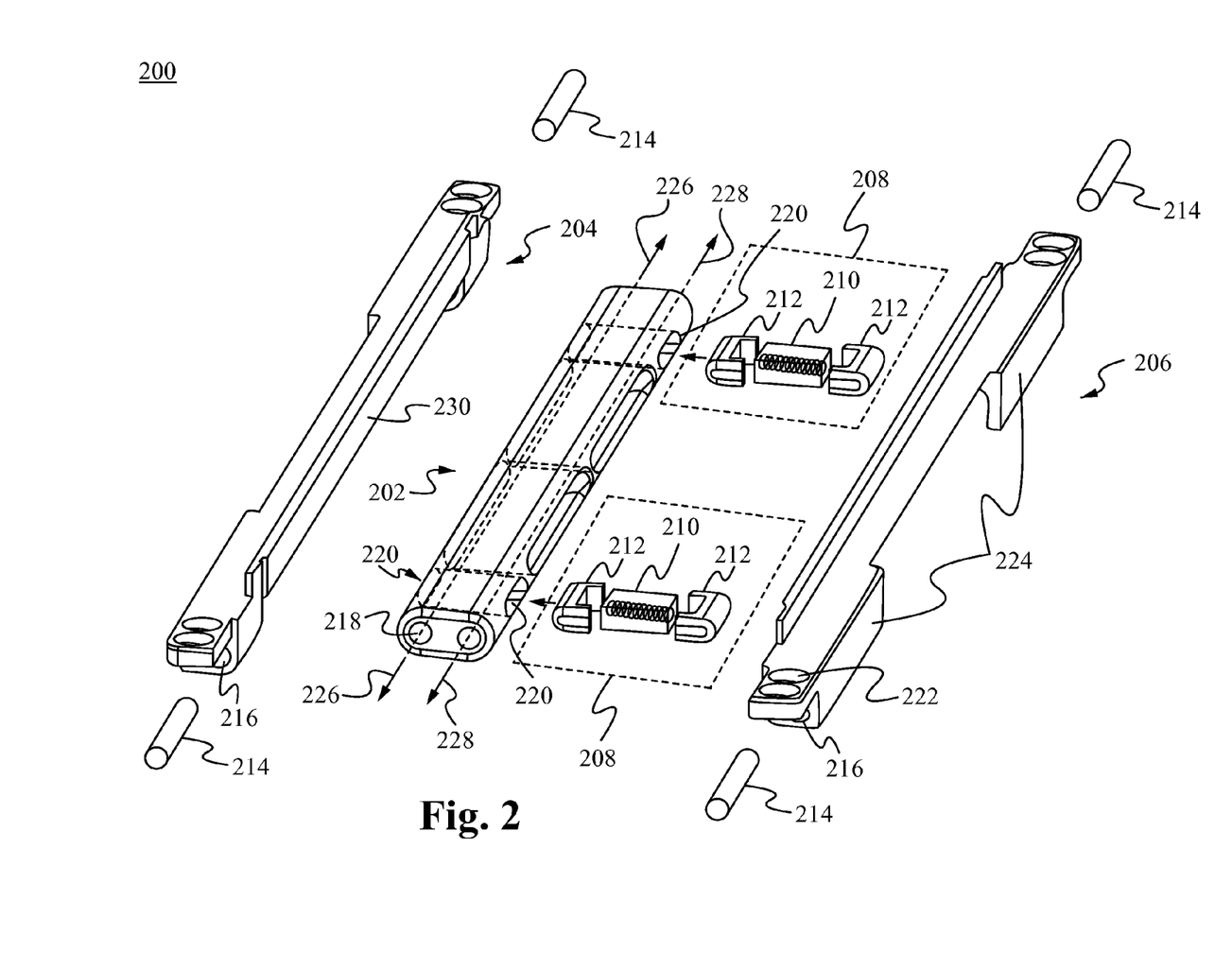
FIG. 2 illustrates components of a dual screen display hinge device in accordance with some embodiments of the present invention.

FIG. 2 illustrates components of a dual screen display hinge device 200 in accordance with some embodiments of the present invention. In some embodiments, the device 200 comprises a core 202, a first bracket 204, a second bracket 206, and a detaining mechanism 208. The first bracket 204 and the second bracket 206 are able to be coupled to the core 202. In some embodiments, the first and the second brackets 204 and 206 are attached to the core 202 through pins 214. The pins 214 are able to be placed in holes 216 of the brackets 204 and 206 and holes 218 on the core 202, so that the brackets 204 and 206 are able to be connected to the core 202. The first bracket 204 is able to rotate around a first axis 226. Similarly, the second bracket 206 is able to rotate around a second axis 228. In some embodiments, the brackets 204 and 206 are designed to have internal surfaces 230. The internal surfaces 230 are able to have one side perpendicular to the other side, so that the brackets 204 and 206 are capable of individually rotating 90° around the first axis 226 and the second axis 228 of the core 202. In some embodiments, the brackets 204 and 206 comprise surface 224 and holes 222. The surface 224 and holes 222 are able to be used to couple with screens or displays, such as LCD and LED. In some embodiments, the surface 224 is able to comprise a screen that is embedded therewithin.

In some embodiments, the detaining mechanism 208 comprises elastic components, such as spring members 210 and cam follower 212, which can be fitted in hole 220. The cam follower 212 is capable of enclosing the spring members 210 forming a compressible detaining mechanism 208 allowing the core 202 quickly interchangeable among several pre-defined positions or angles on the brackets 204 and 206, such as a first terminal position, a second terminal position, and an intermediate position. The first terminal position is able to be 90° perpendicular to the second terminal position, and the intermediate position is able to be in between the first terminal position and the second terminal position. More details about the pre-defined positions will be discussed in the following sections.

Figure 3A:
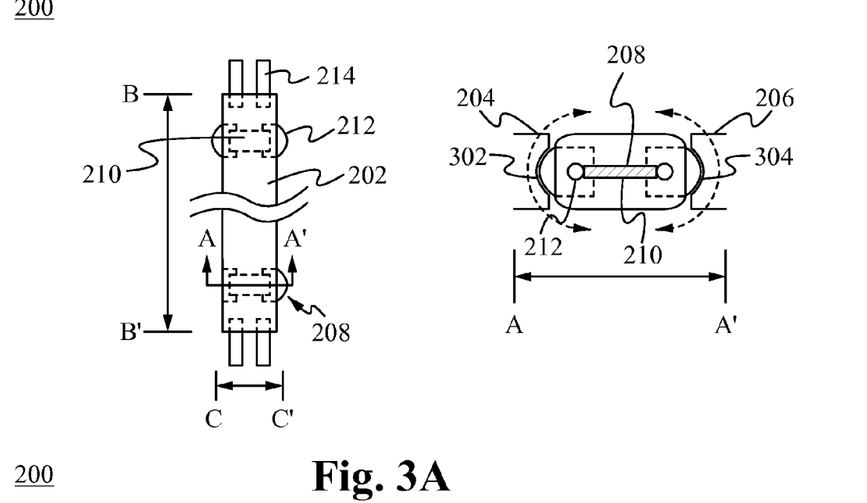
FIG. 3A illustrates a cross section view of the dual screen display hinge device in accordance with some embodiments of the present invention.

FIG. 3A comprises a cross section view of the dual screen display hinge device 200 (FIG. 2) in accordance with some embodiments of the present invention. FIG. 3A and FIG. 2 share the same number labels. In some embodiments, the device 200 comprises a core 202, which can be a spine or a link. The core 202 is able to be made from various materials, such as aluminum and plastic. A person of ordinary skill in the art will appreciate that any material is able to be used to make the core. The material is able to be stiff, flexible, durable, and any other proper properties. In some embodiments, the core 202 comprises holes 220 (shown in FIG. 2) to accommodate the detaining mechanism 208, so that the detaining mechanism 208 is able to be fitted into the core 202 while having a portion of the detaining mechanism 208 protruding out of the side of the core 202. In some embodiments, the detaining mechanism 208 comprises cam follower 212 enclosing spring members 210. A person who has ordinary skill in the art would appreciate that the detaining mechanism can be made in any structures, so long as it can retain and/or detain a position or angle of the core 202 on the brackets 204 and 206. The above mentioned pre-defined positions and angles are illustrative examples, and the detaining mechanism 208 is capable of detaining the brackets 204 and 206 at any angles and positions along their paths of angular rotation, such as 5°, 10°, 30°, 60°, and 100°. In some embodiments, the core 202 comprises pins 214, such as dual pins shown in FIG. 3A. The pins 214 are capable of acting as axis allowing the angular rotation movements of the brackets 204 and 206.

In some embodiments, the length of the core 202 or spine is about 70 mm (B-B'), the width of the core 202 is about 6-7 mm (C-C'), and the thickness of the core 202 is about 3-5 mm. A person of ordinary skill in the art will appreciate that any length, width, and thickness of the core are applicable, so long as the core 202 and the brackets 204 and 206 can function as intended. For example, the size of the core 202 can be larger than the size described above when the device 200 is applied to a notebook computer. The size of the core can be smaller than the size mentioned above when the device is applied to a wrist watch. A person of ordinary skill in the art will appreciate that the device 200 is capable of applying on any electronic devices, such as cell phones, PDA, music/video players, watches, and computers. A person of ordinary skill in the art will appreciate that the device 200 is capable of applying on any devices that have one or more screens or one or more interfaces, such as keypads and any other inputting/outputting devices.

Still referring to FIG. 3A, a cross section view (A-A') of the detaining mechanism 208 is illustrated. In some embodiments, the brackets 204 and 206 comprise one or more recess points 302 and 304. The recess points 302 and 304 are able to receive the protruded portion of the detaining mechanism 208, so that the detaining mechanism 208 is able to be temporarily detained, stopped, or retained in the recess points 302 and 304. The detaining mechanism 208 is able to be compressed inward when an external forced is applied to change a detaining location to a different detaining location on the brackets 204 and 206.

Figure 3B:
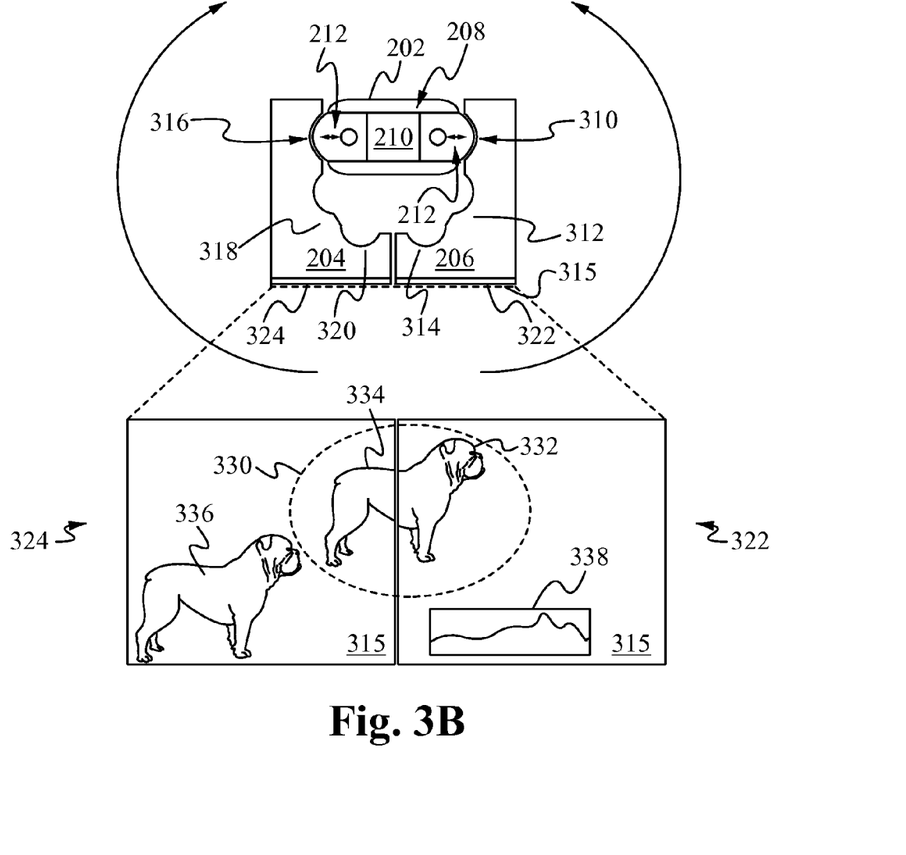
FIG. 3B illustrates a bottom view of the dual screen display hinge device and a joined screen in accordance with some embodiments of the present invention.

FIG. 3B shows a bottom view of the dual screen display hinge device 200 (FIG. 2) and a joined screen in accordance with some embodiments of the present invention. FIG. 3B and FIG. 2 share the same number labels. The device 200 is able to be coupled with the first bracket 204 and the second bracket 206 through the detaining mechanism 208. The cam followers 212 are able to be received at the recess positions 302 and 304 (FIG. 3A). In some embodiments, the recess positions 302 (FIG. 3A) comprise a first terminal position 316, an intermediate position 318, and a second terminal 320 on the first bracket 204. In some other embodiments, the recess positions 304 (FIG. 3A) comprises a first terminal position 310, an intermediate position 312, and a second terminal 314 on the second bracket 206. The detaining mechanism 208 makes the core 202 capable of quickly interchanging its locations among the recess positions 310-320. In some embodiments, the first bracket 204 comprises a screen 324 and the second bracket 206 comprises a screen 322. The first screen 324 and the second screen 322 are able to be joined together and form a single display 315 or a substantial continuous big screen when the detaining mechanism 208 is resting at the first terminal position 316 of the first bracket 204 and the first terminal position 310 of the second bracket 206. In some embodiments, the single display 315 mentioned above use the first screen 324 joining with the second screen 322 to play a single object, picture, or a movie. For example, a first half 332 of a dog 330 is been shown on the second screen 322 and a second half 334 of the dog 330 is shown on the first screen 324, thereby the dog 330 is jointly been shown on the single display/screen. In some embodiments, a dog 336 is shown on the first screen 324 and the stock price 338 is shown on a second screen 322, and the first screen 324 is joining the second screen 322 forming a physically side-by-side big display while having different objects, pictures, or movies been presented on the first screen 324 and the second screen 322 respectively. For example, a dog 306 is shown on screen 324 and stock price graph 338 is shown on the screen 322. In some embodiments, the core 202 of the device 200 is concealed or substantial part of the body of the core 202 is not been viewed from the front viewing angle, thereby a substantial continuous display is formed and experienced by a user.

Figure 4A:
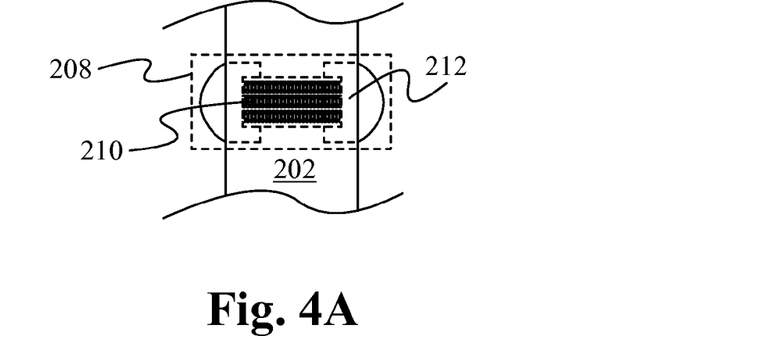
FIG. 4A illustrates a cross section view of the detaining mechanism of the dual screen display hinge device in accordance with some embodiments of the present invention.

FIG. 4A shows a cross section view of the detaining mechanism 208 (FIG. 2) in accordance with some embodiments of the present invention. FIG. 4A and FIG. 2 share the same number labels. In some embodiments, the detaining mechanism 208 comprises one or more elastic members 210 and cam follower 212. In some embodiments, the elastic members 210 comprises springs, elastic plastic, rubbers, or any other materials that are compressible or stretchable when an external force is applied and capable of returning back to original shape when applied forced is removed. In some embodiments, the elastic member 210 is assembled/located in a pocket or hole 220 (FIG. 2) of the core 202 and the cam follower 212 is then assembled in the same pocket or hole 210 (FIG. 2). The cam follower 212 can enclose the elastic member 210.

Figure 4B:
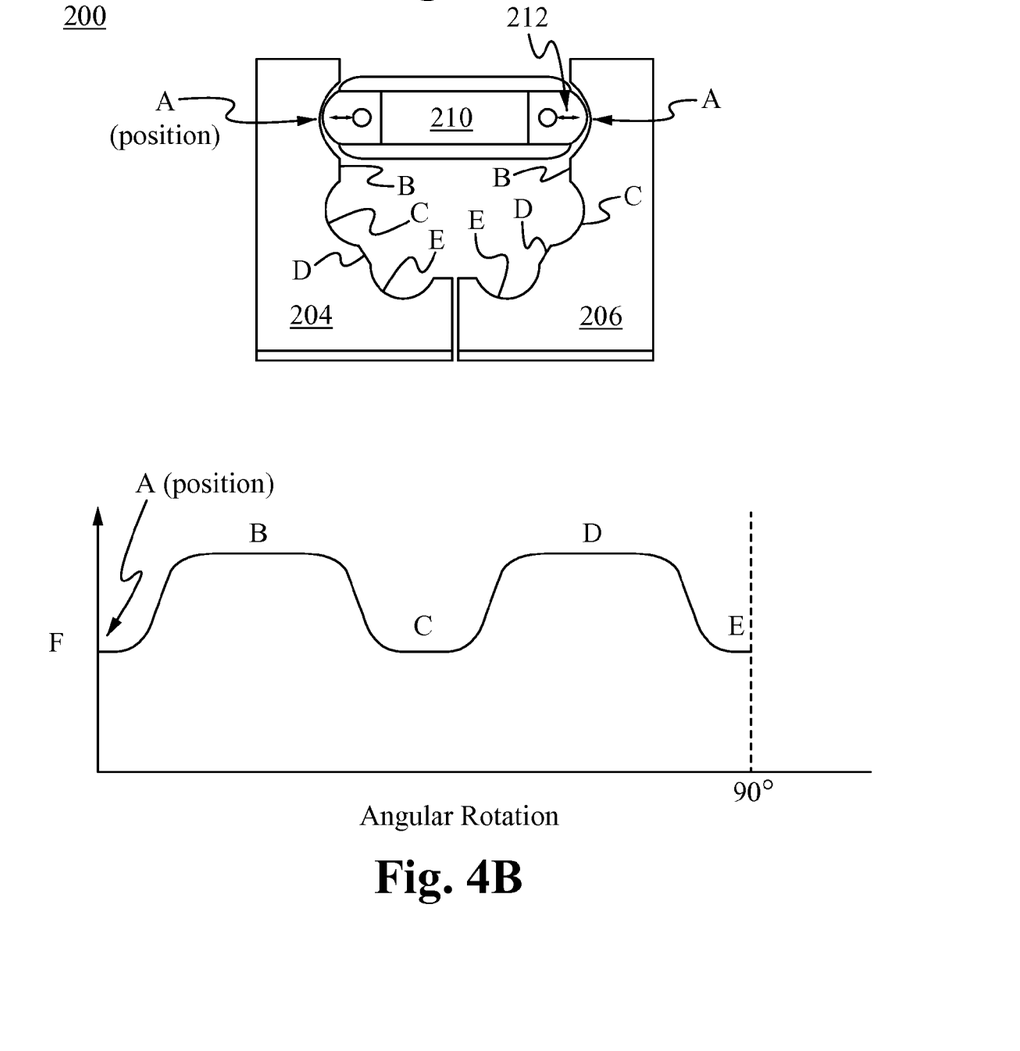
FIG. 4B illustrates a bottom view of the dual screen display hinge device and includes a diagram showing an elastic member loading force versus degree of angular rotation in accordance with some embodiments of the present invention.

FIG. 4B illustrates a bottom view of the dual screen display hinge device and includes a diagram showing an elastic member loading force in accordance with some embodiments of the present invention. FIG. 4B and FIG. 2 share the same number labels. In some embodiments, the device 200 (FIG. 2) comprises a detaining mechanism 208, which has a spring member to facilitate the position change among several pre-defined positions A, C, and E. In some embodiments when the detaining mechanism is in the terminal positions A, the spring member inside the detaining mechanism is in an unloaded condition. The spring member becomes loaded when the brackets 204 and 206 rotate along path B. When the spring member reach point C, an intermediate point, the spring member becomes unloaded. Similarly, the spring member becomes loaded again when it travels on the path D. The spring member becomes unloaded when it reaches the other terminal position E. A person of ordinary skill in the art will appreciate that any numbers of the detaining/retaining positions are able to be included.

Figure 5A:
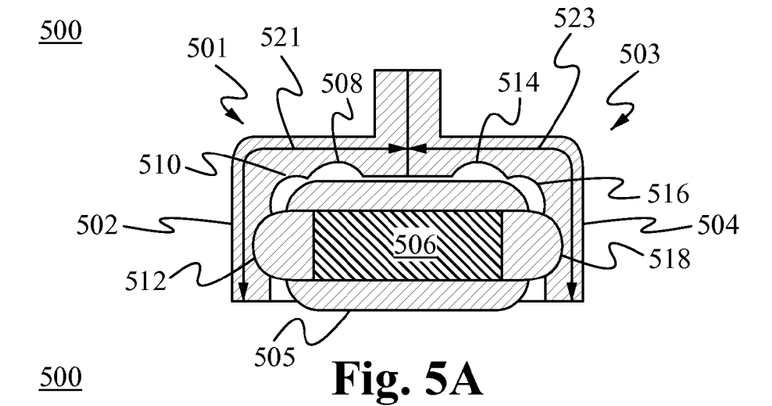
FIGS. 5A-5C illustrate top views of the positions of the dual screen display hinge device in accordance with some embodiments of the present invention.
Figure 5B:
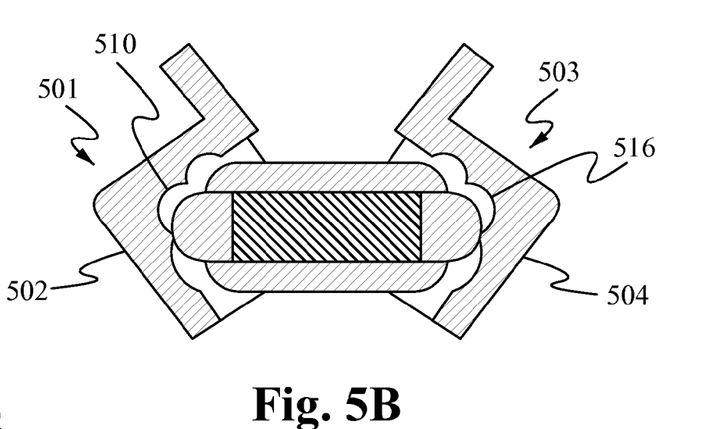
Figure 5C:
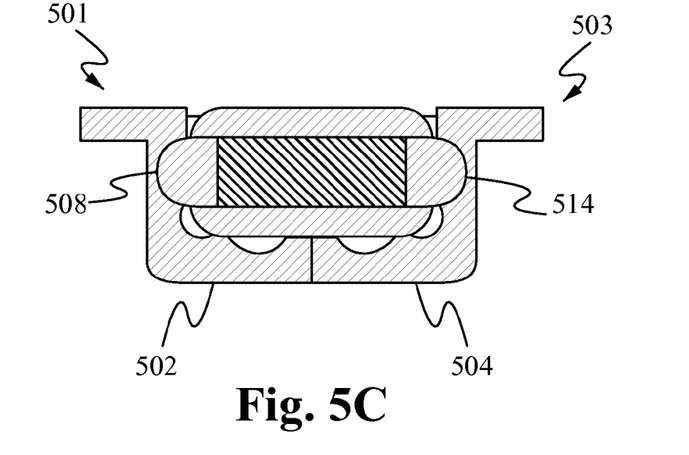

FIGS. 5A-5C illustrate top views of the positions of the dual screen display hinge device 500 in accordance with some embodiments of the present invention. In some embodiments, the device 500 comprises a core 505, first rotatable member 501, and second rotatable member 503. In some embodiments, the core 505 comprises a detaining member 506 capable of detaining or keeping the core member 505 at pre-defined locations on the first rotatable member 501 and/or the second rotatable member 503. A person of ordinary skill in the art will appreciate that any numbers of pre-defined locations are applicable. In some embodiments, the pre-defined locations are evenly distributed along the angular rotational paths 521 and 523. In some embodiments, the pre-defined locations are not evenly distributed. In some other embodiments, the detaining member 506 of the core member 505 is able to stop the first and/or the second rotational member 501 and/or 503 at any angle without having pre-defined locations. A person of ordinary skill in the art will appreciate that the detaining member 506 is able to be located on the first rotational member 501 and/or the second rotational member 503.

In some embodiments, the dual screen display hinge device 500 comprises a core 505, a detaining member 506, a first rotational member 501, and a second rotational member 503. A first screen 502 is coupled with the first rotational member 501 and a second screen 504 is coupled with the second rotational member 503. In some embodiments, the dual screen display hinge device 500 is designed to have a first mode (FIG. 5A), a second mode (FIG. 5B), and a third mode (FIG. 5C). In some embodiments, the first mode and the second mode are resting modes and the third mode is an operating mode. In some other embodiments, the first mode is a resting mode and the second mode and the third mode are operating modes. A person of ordinary skill in the art will appreciate that any other modes, such as stand-by, are applicable so long as the modes are within the scope of regular electronic device operations. In the following examples, the operation of the dual screen display hinge device 500 is described. In addition to the components mentioned above, the device 500 can comprise more electronic components and function as a consumer electronic device, such as a cell phone. The electronic components are able to be either located in the core 505 and/or on the first and second rotational members 501 and 503. In the first mode, the device 500 can be in a resting mode. The first and second rotational members are detained in the third set of pre-defined locations 512 and 518. The first screen 502 and the second screen 504 are parallel to each other and facing outward to the opposite directions. In the first mode, the first screen 502 and the second screen 504 are able to show blank/black screen, time, or any other information. In some embodiments, the device 500 are in stand-by mode, power-off mode, or operating mode in the first mode. In the second mode, the device 500 is able to be in an intermediate position, and the core member 505 is able to be detained in the intermediate position 510 and 516 on the first and second rotational members 501 and 503. The first screen 502 and second screen 504 are facing in a non-parallel angled direction. In the third mode, the device 500 is able to be in a first set of pre-defined locations 508 and 514. The first screen 502 and the second screen 504 are aligned in a surface forming a single display or a substantially continuous display. In some embodiments, the third mode is able to be in an operating mode of the device 500, so that the device 500 is able to split an image of a movie using the first screen 502 to play a first half of the picture and using the second screen 504 to play the second half of the picture.

Figure 6:
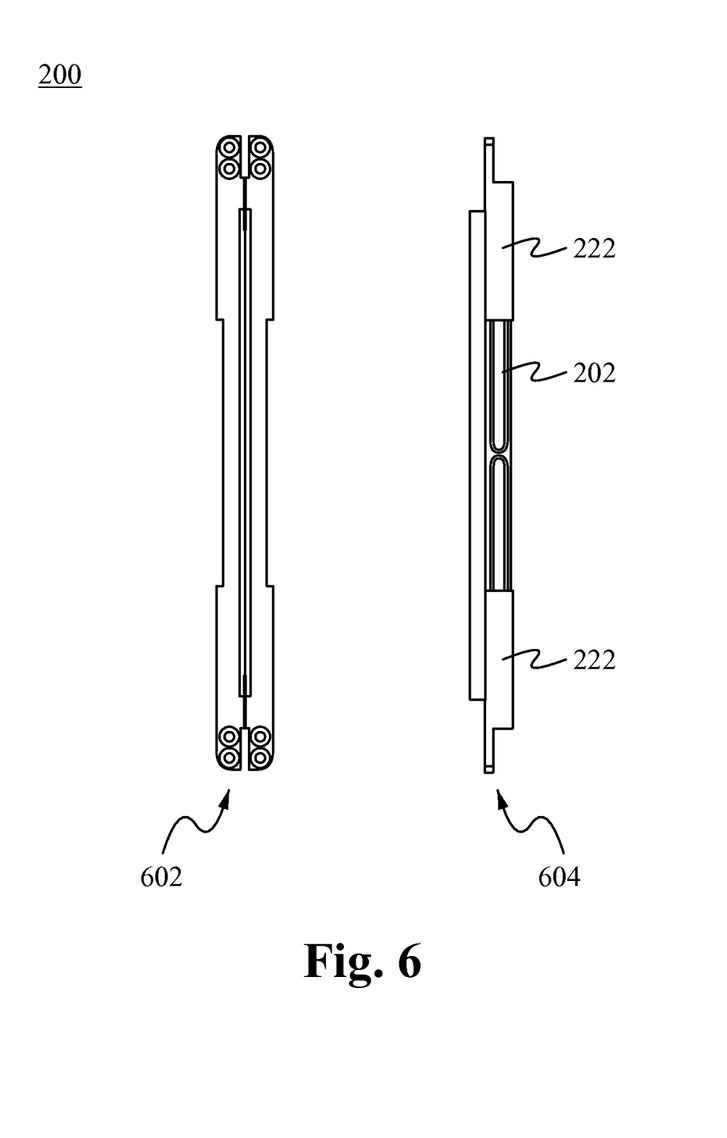
FIG. 6 illustrates side views of the dual screen display hinge device in accordance with some embodiments of the present invention

FIG. 6 illustrates side views 602 and 604 of the dual screen display hinge device 200 (FIG. 2) in accordance with some embodiments of the present invention. Views 602 and 604 show a closed position of the dual screen display hinge device 200. A close position can be a resting mode of the device 200, such as the first mode (FIG. 5A).

Figure 7:
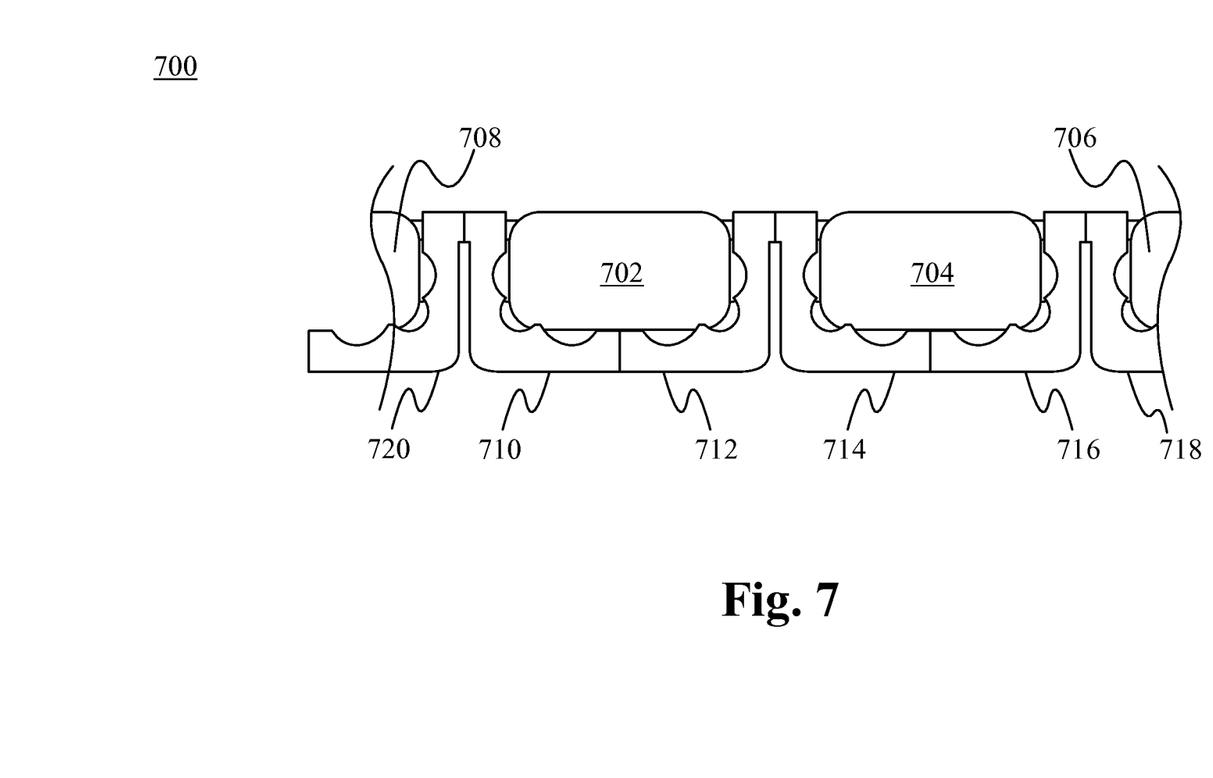
FIG. 7 illustrates a multiple screen display hinge device in accordance with some embodiments of the present invention.

FIG. 7 illustrates a multiple screen display hinge device 700 in accordance with some embodiments of the present invention. In some embodiments, the multiple screen display hinge devices 700 comprises multiple dual screen display hinges, such as multiple dual screen display hinges 200 (FIG. 2). The device 700 can comprise dual screen display hinges 702, 704, 706, and 708. A first screen 710 of dual screen display hinge 702 is coupled with the second screen display 720 of dual screen display hinge 708. A first screen 714 of dual screen display hinge 704 is coupled with the second screen display 712 of dual screen display hinge 702. A first screen 718 of dual screen display hinge 706 is coupled with the second screen display 716 of dual screen display hinge 704. By connecting the screens 720, 710, 712, 714, 716, and 718, the screens 710-720 forms a single display and/or a substantial continuous display. A person of ordinary skill in the art will appreciate that any numbers of dual screen display hinges 200 (FIG. 2) are able to be used to form a single display as described above.

Figure 8:
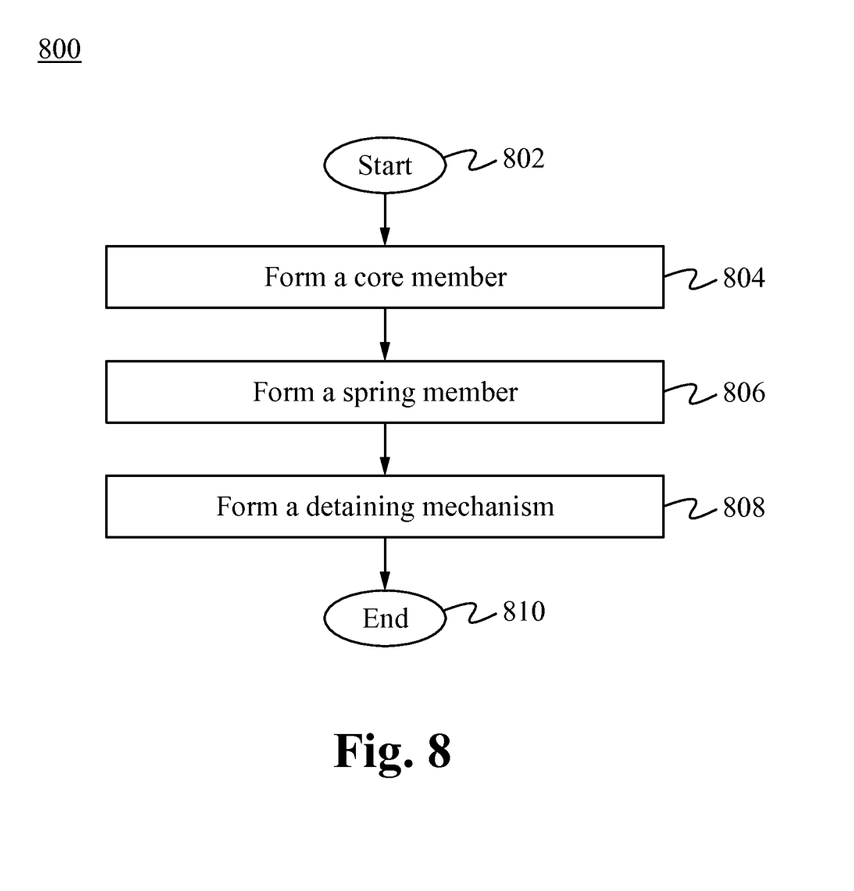
FIG. 8 is a flow chart illustrating a method of forming the dual screen display hinge device in accordance with some embodiments of the present invention.

FIG. 8 is a flow chart illustrating a method 800 of forming the dual screen display hinge device in accordance with some embodiments of the present invention. The method 800 can start from a Step 802. At Step 804, a core member is formed. The core member can be a hinge. The hinge can comprise pins that are pivots or rotational points that the brackets can rotate around. In some embodiments, the pins act as two independent rotational points, so that a first bracket and a second bracket are capable of independently rotating around the core. In some embodiments, each of the brackets is designed to be able to rotate 90° for a combined result of 180°. In some embodiments, the pins are press fit into the core. In some embodiments, the pins are used for fastening the assembly into a fixed chassis.

At Step 806, a spring member is formed. In some embodiments, the spring member is assembled/located in a pocket of the core member. In some embodiments, the spring member is loaded in a direction transverse to the pivot point/rotational axis. A cam follower or enclosing element is able to be assembled in the same pocket enclosing the spring member. At Step 808, a detaining mechanism is formed by placing the cam into one or more of the cavities/pre-defined location on the brackets, so the cam with the springs can act as a detaining member of the detaining mechanism capable of detaining the brackets to prevent uncontrolled rotating movements of the brackets. As the brackets rotate around the pivots, the cams ride on the bracket surface in a constant load state until meeting the next cavities/pre-defined locations.

The dual screen display hinge in accordance with some embodiments of the present invention is advantageous over the typical hinged electronic device in a way that the present dual screen display hinge can be used to join multiple screens to form a single and continuous display, so that the users are able to enjoy a non-interrupting viewing experience.

The description of the present disclosure is presented to enable one of ordinary skill in the art to make and use the invention and is provided in the context of a patent application and its requirements. Various modifications to the described embodiments will be readily apparent to those persons skilled in the art and the generic principles herein may be applied to other embodiments. Thus, the present invention is not intended to be limited to the embodiment shown but is to be accorded the widest scope consistent with the principles and features described herein. It will be readily apparent to one skilled in the art that other modifications may be made to the embodiments without departing from the spirit and scope of the invention as defined by the appended claims.

What is claimed is:

1. A method of forming a joined screen display comprising:
   a. forming a body comprising at least a portion of a first rotatable member, at least a portion of a second rotatable member, or both, wherein each of the first rotatable member and the second rotatable member comprise a first inner recess and a second inner recess;
   b. forming a first screen on the first rotatable member;
   c. forming a second screen on the second rotatable member, wherein the first screen and the second screen form a substantially continuous display when at least a portion of the first screen becomes substantially parallel to at least a portion of the second screen; and
   d. forming at least one detaining member on the body comprising an elastic element and one or more cams, wherein the detaining member is positioned through a core member on the body such that the cams are adjacent the first and second inner recesses and selectively detain the first rotatable member, the second rotatable member, or both at one or more of pre-defined detaining locations on the first rotatable member, the second rotatable member, or both.

2. The method of claim 1, wherein the first rotatable member is capable of rotating around a first axis and the second rotatable member is capable of rotating around a second axis, wherein the first axis and the second axis are contained within the body.

3. The method of claim 2, wherein the first axis is substantially parallel to the second axis.

4. The method of claim 1, wherein the first screen and the second screen face outward in opposite directions when the first screen is substantially parallel to the second screen.

5. The method of claim 1, further comprising a detaining mechanism capable of detaining the first screen, the second screen, or both in a pre-determined angel.

6. The method of claim 5, wherein the first screen, the second screen, or both are capable of instantly interchanging between a first position and a second position by changing a force of engagement of the detaining mechanism.

7. The method of claim 6, wherein the first screen is parallel to the second screen in the first and the second positions, wherein the first position of the first screen is perpendicular to the second position of the first screen.

8. The method of claim 1, further comprising an electronic device comprises the first screen, the second screen, the body, or a combination thereof.

9. The method of claim 8, wherein the electronic device is in a power-on status when the substantially continuous display is formed.

10. The method of claim 8, wherein the electronic device is in a power-off status when the first screen disjoins from the second screen.

11. The method of claim 8, wherein the electronic device comprises a phone, a computer, a music player, or a combination thereof.

* * * * *